United States Patent Office 3,405,244
Patented Oct. 8, 1968

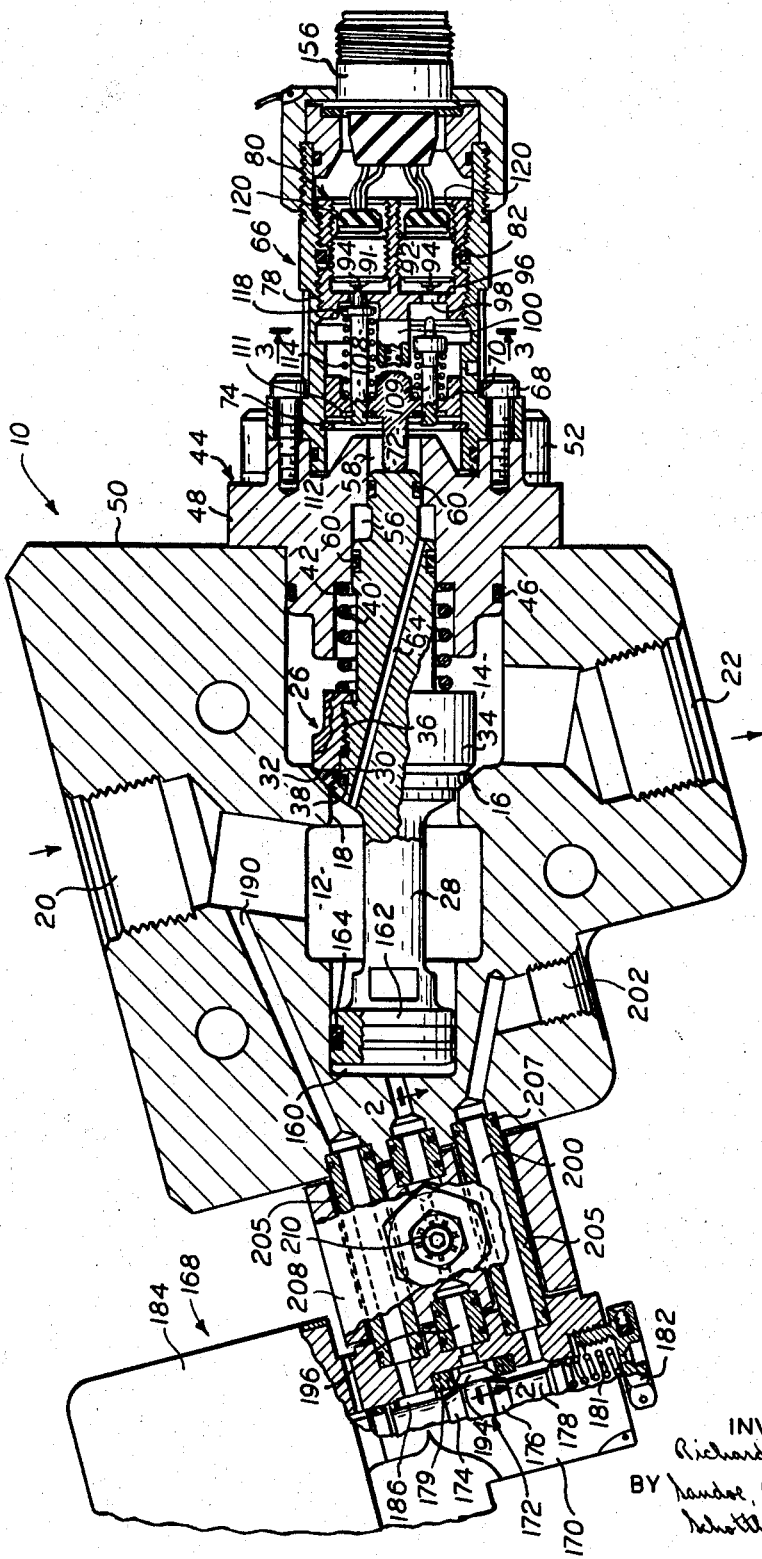
FIG. I.
INVENTOR
Richard Collins
BY [signature]
ATTORNEYS.

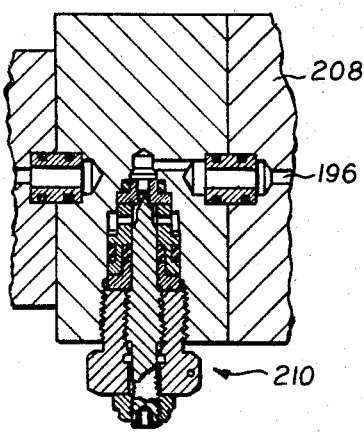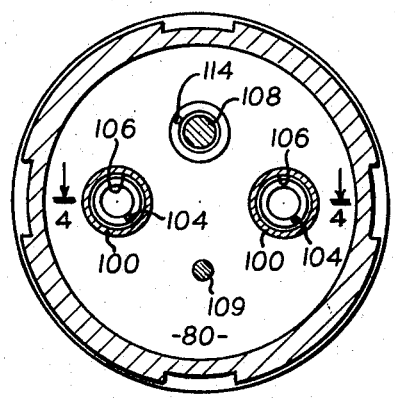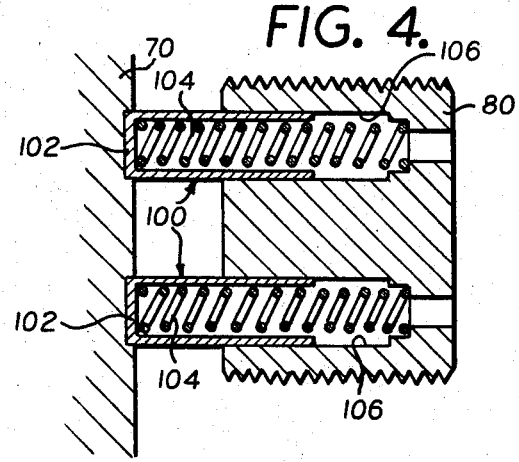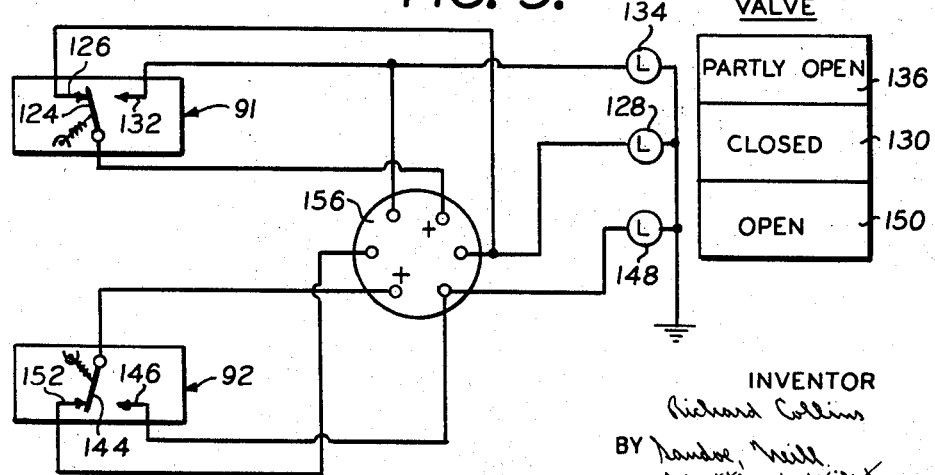

3,405,244
ELECTRO-MECHANICAL DEVICE RESPONSIVE TO
POSITION OF RECIPROCATING PART
Richard Collins, 361 Diamond Spring Road,
Denville, N.J. 07834
Filed Feb. 21, 1966, Ser. No. 529,154
10 Claims. (Cl. 200—82)

ABSTRACT OF THE DISCLOSURE

For providing signals to an electric circuit to indicate the position of a reciprocating valve element, this invention has a switch actuator located between the switch and the valve element that moves in a predetermined stroke between open and closed positions. The actuator moves as a unit with the valve element during at least the latter portion of the stroke of the valve element. The actuator operates motion transmitting means that include a yielding means between the actuator and the switch for transmitting motion from the actuator to the switch. The stroke of this motion transmitting means is limited by an abutment. In the preferred construction there are two switches with correlated operating mechanism to close one when the valve element is at either end of its stroke and to close the other when the valve element is in a mid position.

Background and summary of the invention

This invention relates to apparatus for indicating the position of a part that has reciprocating motion, for example, a valve element. When used with a valve element, the invention indicates whether the valve element is in open, closed, or partially open position.

It is an object of the invention to provide improved apparatus for indicating the position of a part that has reciprocating motion. It will be described as applied to a valve. Even though a control for a valve actuator may be in position to supply power, this is no assurance that the valve element has been moved into the intended position because there may be a failure of the power supply. In the case of pilot-operated valves, energy may be supplied to an electrical actuator, but there may be a failure in the supply of working fluid from the pilot to the actuator of the main valve.

In the preferred embodiment of the invention, a valve element actuates electric switches in which the purchaser of the valve can alter the connections to provide various combinations of signals, as desired.

Other objects, features, and advantages of the invention will appear or be pointed out as the description proceeds.

Brief description of the drawing

In the drawing, forming a part hereof, in which like reference characters indicate corresponding parts in all the views:

FIGURE 1 is a vertical sectional view showing the invention as embodied in a pilot-operated valve with a magnetically controlled pilot;

FIGURES 2 and 3 are sectional views taken on the section lines 2—2 and 3—3, respectively, of FIGURE 1;

FIGURE 4 is a sectional view taken on the line 4—4 of FIGURE 3; and

FIGURE 5 is a wiring diagram for the valve shown in the other figures.

Description of preferred embodiment

The construction shown in FIGURE 1 includes a housing 10 enclosing a valve chamber which has an inlet section 12 and an outlet section 14 with a seat 16 located at one end of a passage 18 through which the sections 12 and 14 communicate with one another. Fluid is supplied to the inlet section 12 through an inlet port 20 and fluid flows from the outlet section 14 through an outlet port 22.

A valve element 26 includes a stem 28 having a shoulder 30 against which a plastic seating element 32 is clamped by a nut 34 which screws over threads 36 on the stem 28. An O-ring 38, located in a circumferential groove in the stem 28, behind the seating element 32, prevents leakage of high-pressure fluid between the seating element 32 and the stem 28.

A spring 40 is compressed between the nut 34 and a shoulder 42 of a bushing 44 which closes one end of the outlet section 14 of the valve chamber. This bushing 44 fits snugly within the end of the valve chamber and has an O-ring 46 for preventing leakage. The bushing 44 has a flange 48 which contacts with a back face 50 of the housing 10 and this flange 48 is secured to the housing 10 by screws 52 threaded into the housing 10.

The rearward end of the valve stem 28 is guided in a bore 56 and a smaller bore 58 formed in the bushing 44 and coaxial with the seat 16 of the valve chamber. O-rings 60 are provided in circumferential grooves in the portions of the stem 28 which slide in the bores 56 and 58 to prevent leakage of high-pressure fluid. The bore 56 is used for counterbalancing and communicates with the inlet section 12 of the valve chamber through a passage 64 in the valve stem 28.

An actuator and switch housing 66 is attached to the back of the bushing 48 by screws 68. A portion of the inside of the housing 66 is cylindrical and serves as a guide for an actuator 70 which slides in the housing 66 like a piston. The actuator 70 has a stem 72 which extends into the bore 58 and into contact with the rearward end of the valve stem 28. A snap ring 74 in the housing 66 limits forward movement of the actuator 70.

There are threads 78 on a part of the inside wall of the housing 66; and a switch holder 80 screws into the housing 66 along these threads 78. A plastic locking element 82 holds the switch holder 80 in any set position along the threads 78.

The switch holder 80 has sockets holding switches 91 and 92. These are preferably double-throw switches with operating plungers 94. There is a partition 96 across the switch holder 80 just beyond the operating plungers 94 and there are openings 98 in the partition in front of each of the plungers 94.

The switch holder 80 also supports plungers 100 (FIGURES 3 and 4) pressing the actuator 70 forward away from the switch holder 80. There are two plungers 100 at diametrically opposite locations in the switch holder 80. Each of these plungers 10 consists of a sleeve closed at one end by a wall 102; and there is a spring 104 located within each of the plungers 100 and in which the plungers 100 are guided in the switch holder 80. The springs 104 urge the plungers 100 into contact with the actuator 70 and hold the stem 72 (FIGURE 1) in contact with the rearward end of the valve stem 28.

The actuator 70 carries two switch operators 108 and 109. Each of these switch operators has a cylindrical portion which slides in a guide 111 in the forward portion of the actuator 70. A snap ring 112 in the forward portion of each of the switch operators 108 and 109 limits rearward movement of the switch operators. A spring 114 surrounding each of the switch operators 108 and 109 urges the operator rearwardly and holds the snap ring 112 against the front face of the actuator 70. The spring 114 is compressed between a counterbore in the back face of the actuator 70 and a flange 118 near the back of each of the switch operators 108 and 109.

The switch operator 108 is considerably longer than the switch operator 109 and is located in alignment with the plunger 94 of the switch 91. The switch operator 109 is located in alignment with the plunger 94 of the switch 92. When the valve 26 is in closed position, the switch 91 is located in such a position longitudinally in the holder 80 that the plunger 94 of the switch 91 is adjacent to or in light contact with the switch operator 108. This adjustment is obtained by rotating the switch 91 along a threaded connection 120 in the switch holder 80.

When the valve 26 starts to move toward open position, the switch operator 108 operates the switch 91 and shifts a movable contact 124 (FIGURE 5) away from a fixed contact 126. This opens a circuit of a signal lamp 128 which illuminates a sign 130 for indicating when the valve element is in closed position. A small amount of movement of the contact 124 brings it against another fixed contact 132 and closes a circuit to a lamp 134 which illuminates a sign 136 to indicate that the valve is partly open. The operating of these lamps is an example of the function of these switch-controlled circuits, but it will be understood that other kinds of indicators can be actuated, and other external functions can be performed that are associated with the movement of the part to which the switches are responsive.

The switch 91 now has its plunger 94 at its limit of travel and further movement of the actuator 70 compresses the spring 114 since the flange 118 of the switch operator 108 is larger than the opening through the partition 96 and when the flange 118 contacts with the partition, the operator 108 can travel no further. This feature is desirable as it provides a positive stop for mechanical motion. This mechanical motion is thus prevented from impinging on the swtch in the form of a high force load which might be induced by a rapidly moving element. Continued rearward movement of the actuator 70, as the valve element moves into a wider open position, causes the spring 114 to compress and causes the switch operator 109 to move into contact with the plunger 94 of the other switch 92. The position of the switch 92 is adjusted so that the operator 109 touches the plunger 94 just before the valve element reaches its widest open position, and the final rearward movement of the valve element causes the plunger 94 to operate the movable contact in the switch 92. The element 109 is at the limit of its travel and no further depression of the switch 94 takes place.

Referring again to FIGURE 5, the switch 92 contains a movable contact 144 which is brought against a fixed contact 146 to close a circuit to a signal light 148 which illuminates a panel 150 to indicate when the valve element is in fully open position. The switch 92 also has a fixed contact 152 and the movable contact 144 has a bias toward this front fixed contact 152, but the contact is not used in the wiring diagram of FIGURE 5.

FIGURE 5 shows the switches 91 and 92 connected with terminals of a receptacle 156 into which a plug is inserted for connecting the signal circuits with the switches 91 and 92. This receptacle can be connected in various ways with the signals 128, 134 and 148 by changing the connections of the color-coded conductors from the switches to the receptacle 156 or by changing the wiring of the plug to the signals, as desired. For example, the signal indicating that the valve is partly open, may not be used and the signals may be limited to those showing the valve to be either open or closed.

Referring again to FIGURE 1, the valve element 26 is moved into open position by working fluid pressure supplied to a cylinder 160 in which a piston 162 slides. This piston has a sealing ring 164.

Working fluid for the cylinder 160 is supplied by a pilot valve 168. This pilot valve includes a valve housing 170 containing a valve element 172 which has two tapered areas 174 and 176 which close selectively against seats 178 and 179.

The pilot valve element 172 is urged into position to close against the seat 179 by the force of a spring 181 in a cap 182 which screws into one end of the pilot valve housing 179 in axial alignment with the valve element 172.

The pilot valve element 172 is moved into position to close against the seat 178, against the force of the spring 181, by a magnetic actuator 184 which is supplied with power by manual control or automatic control, as the installation requires.

The pilot valve 168 has a chamber 186 which communicates, through a passage 190, with the inlet passage 20 of the valve housing 10. When the pilot valve element 172 is closed against the seat 178, it is in position to open a clearance between the valve element 172 and the seat 179 so that working fluid from the inlet passage 20 flows through the passage 190 into the chamber 186 and past the seat 179 into a center chamber 194 of the pilot valve. From this center chamber 194, the working fluid flows through a passage 196 to the cylinder 160, and this causes the piston 162 to move toward the right in FIGURE 1 to open the valve element 26.

When it is desired to move the valve element 26 into closed position, the electro-magnetic actuator 184 is de-energized to move the pilot valve element 172 into contact with the seat 179. This shuts off further flow of working fluid from the chamber 186 to the chamber 194 and with the pilot valve element 172 in this position, the pilot valve element is open with respect to the seat 178 and working fluid from the cylinder 160 flows through the passage 196 and center chamber 194 past the valve seat 178 and into a lower end chamber 198 from which the working fluid exhausts through a passage 200 and exhaust port 202.

The pilot valve 168 is merely representative of means for selectively supplying working fluid to the cylinder 160 and for exhausting the working fluid from this cylinder. The specific construction of the pilot valve 168 is not a part of this invention. It is shown as a separate element from the housing 50 and it is connected with the housing 50 by bushings 205 which form parts of the working fluid passages and which are sealed at both ends by O-rings 207, in accordance with conventional practice.

There is a connector 208, through which the passage 190, 196 and 200 extend and in which portions of the bushings 205 are located. This connector 208 is shown with a portion of the passage 196 constructed with reduced diameter and controlled by an adjustable needle valve 210 which can be used to control the rate of flow of fluid through the passage 196; and thus to control the speed of response in the operation of the valve element 26 following operation of the pilot valve.

The preferred embodiment of the invention has been illustrated and described, but changes and modifications can be made and some features can be used in different combinations without departing from the invention as defined in the claims.

What is claimed is:

1. Apparatus for controlling an electric circuit to indicate the position of a valve element including in combination an assembly comprising a housing and a valve element that has reciprocating movement in said housing through a predetermined stroke between open and closed positions a second housing connected with the first housing in fixed relation thereto, an electric switch in the second housing, an actuator between the valve element and the switch and that moves as a unit with said valve element during at least the latter portion of the stroke of said valve element, motion transmitting means operably connecting said actuator and the switch and including yielding means between the actuator and the switch and through which the motion of the actuator is transmitted to the switch, an abutment in the path of the yielding means and with which the yielding means come in contact, and adjustment means for regulating the relative positions of the switch and abutment with respect to the position of the valve element at one end of the stroke of said valve element which position is to be indicated by the switch circuit.

2. The apparatus described in claim 1 characterized by the abutment forming a fixed part of the second housing, a holder by which the switch is retained in the second housing, the holder being movable toward and from the abutment and constituting the adjustment means.

3. The apparatus described in claim 2 characterized by the abutment having an opening therein and the yielding means having a projection thereon that extends through the opening to contact with the switch.

4. The apparatus described in claim 3 characterized by the switch holder being threaded and being adjustable along threaded guides within the second housing.

5. Apparatus for controlling an electric circuit in accordance with the movement of a part including in combination an assembly including a housing and a part that has reciprocating movement in said housing through a predetermined stroke, an actuator that moves as a unit with said part during at least the latter portion of the stroke of said part, a second housing connected with the first housing in fixed relation thereto, two electric switches in the housing, a common operator for the switches, motion-transmitting connections operably connecting said operator with the part that has reciprocating movement, both of said switches being at the same end of the stroke of said part, the common operator having radially projecting parts that extend transversely of its direction of movement with said parts extending across the front of the switches, rods extending from said parts toward the switches, there being a different rod for each switch, the end of each rod, remote from said parts, being oriented to contact with its associated switch and to operate the switch when the common operator moves the rods toward the switches, one of said rods having its end closer to its switch than does the other rod to operate the switches in sequence.

6. The apparatus described in claim 5 characterized by at least one of the rods being slidable axially in guide bearings in the radially extending part of the operator, spring means urging the slidable rod to move toward its switch, a stop on the rod limiting the extent of movement of the rod by said spring means, the spring means being of sufficient strength to hold the rod against sliding movement while the rod operates its switch, and the switch means then yielding while the operator moves the other rod into contact with its switch.

7. The apparatus described in claim 6 characterized by both of the rods being slidable in guide bearings in the radially extending part of the operator, and both of the rods having spring means and a stop on the rod for limiting axial movement of the rod in the operator toward its switch, one of the rods being longer than the other and the rod being held in the operator at substantially the same axial positions along the operator.

8. The apparatus described in claim 7 characterized by a holder in which the switches are located in fixed relation and side by side, a housing in which the switch holder is secured and in which the switch holder is adjustable axially toward and from the operator, sockets in the switch housing at diametrically opposite locations and with their axis parallel and extending toward the operator, a hollow plug in each of the sockets and slidable axially therein, a spring in each of the hollow plungers and compressed against an end wall of the socket, the springs holding the plungers against the operator and urging the operator away from the switches and into the path of the reciprocating part to which the operation of the switches is responsive, a front wall of the switch holder having openings therein for exposing the switches to the rods, shoulders on the rods of larger diameter than said openings and serving as stops to limit the amount of movement of the ends of the rods through said openings in the switch holder, the radially projecting parts of the operator forming flange means that slide in the housing as a bearing to guide the operator, and a stop in the housing limiting movement of the operator away from the switch holder.

9. Apparatus for controlling an electric circuit in accordance with the movement of a part that has reciprocating movement including in combination two electric switches, a common operator for the switches, motion-transmitting connections operably connecting said operator with the part that has reciprocating movement, both of said switches being at the same end of the stroke of said part, the common operator having radially projecting parts that extend transversely of its direction of movement with said parts extending across the front of the switches, rods extending from said parts toward the switches, there being a different rod for each switch, the end of each rod, remote from said parts, being oriented to contact with its associated switch and to operate the switch when the common operator moves the rods toward the switches, one of said rods having its end closer to its switch than does the other rod to operate the switches in sequence, the apparatus being characterized by a housing in which the switches and the operator are located, a valve assembly having a valve element with a stem which constitutes the reciprocating element to which the switches are to be responsive, the valve assembly including a valve housing with an opening in one end through which the valve stem is exposed, and means connecting the first housing to the valve housing with the operator in the path of movement of the valve stem for at least the latter part of the stroke of the valve and valve stem.

10. The apparatus described in claim 9 characterized by the switches being secured to a holder that is adjustable in the first housing toward and from the valve housing.

References Cited

UNITED STATES PATENTS 2,767,293   10/1956   Jordan et al.

FOREIGN PATENTS 1,202,862   10/1965   Germany.

BERNARD A. GILHEANY, *Primary Examiner.*

H. BROOME, *Assistant Examiner.*